US012585294B2

(12) United States Patent
Kostadinov et al.

(10) Patent No.: US 12,585,294 B2
(45) Date of Patent: Mar. 24, 2026

(54) RE-EVALUATING VALVE FIT AND FUNCTION ON A PROCESS LINE

(71) Applicant: Dresser, LLC, Houston, TX (US)

(72) Inventors: Vladimir Dimitrov Kostadinov, Sharon, MA (US); Joseph Georges Shahda, Abington, MA (US); Cyril Nicolas Vlassoff, Saint-Georges des Groseillers (FR); Jeremy Asher Glaun, Sharon, MA (US); David Chunhe Zhou, West Roxbury, MA (US); Christopher Bittner, Magnolia, TX (US); Justin Walter Betley, Raytham, MA (US)

(73) Assignee: Dresser, LLC, Houston, TX (US)

( * ) Notice: Subject to any disclaimer, the term of this patent is extended or adjusted under 35 U.S.C. 154(b) by 410 days.

(21) Appl. No.: 17/899,874

(22) Filed: Aug. 31, 2022

(65) Prior Publication Data

US 2024/0069578 A1     Feb. 29, 2024

(51) Int. Cl.
  *G05D 7/06*     (2006.01)
  *F16K 37/00*     (2006.01)
  *G01F 15/00*     (2006.01)

(52) U.S. Cl.
  CPC ......... *G05D 7/0635* (2013.01); *F16K 37/005* (2013.01); *G01F 15/005* (2013.01)

(58) Field of Classification Search
  CPC . G05D 7/0635; F16K 37/005; F16K 37/0033; G01F 15/005
  See application file for complete search history.

(56) References Cited

U.S. PATENT DOCUMENTS

| | | | | |
|---|---|---|---|---|
| 5,261,459 A | * | 11/1993 | Atkinson | A61M 39/24 |
| | | | | 137/846 |
| 5,801,298 A | * | 9/1998 | Anderson | G01M 3/2876 |
| | | | | 73/40 |
| 9,644,349 B2 | * | 5/2017 | Burrows | G05D 16/2095 |
| 11,078,650 B2 | * | 8/2021 | Stoianov | G05D 16/2026 |
| 2005/0011479 A1 | * | 1/2005 | Kagy | F01L 9/10 |
| | | | | 123/90.15 |
| 2014/0034145 A1 | * | 2/2014 | Burt | F24D 19/0095 |
| | | | | 137/59 |

(Continued)

FOREIGN PATENT DOCUMENTS

| | | |
|---|---|---|
| JP | 2012163499 A | 8/2012 |
| KR | 20190012325 A | 2/2019 |
| WO | 2011014419 A1 | 9/2011 |

*Primary Examiner* — Ziaul Karim
(74) *Attorney, Agent, or Firm* — Paul Frank + Collins P.C.

(57) ABSTRACT

A control system is configured to monitor operation of a flow control, like a control valve. These configurations can use of continuous or real-time data to evaluate fitness or function of the device under operating conditions. This feature can alert operators to problems or issues with one or more devices, or process lines in total. These problems may, for example, indicate that a valve is incorrectly sized for actual working conditions. As a result, engineers may find that the valve is too big (or oversize) or too small (or undersize) because the design process for layout of the process line relies upon a design load that reflects a future maximum (plus some factor of safety), and not the actual working conditions that might prevail once the device is in service in the field.

20 Claims, 3 Drawing Sheets

(56)  References Cited

U.S. PATENT DOCUMENTS

| | | | |
|---|---|---|---|
| 2014/0097367 A1* | 4/2014 | Burt | F24F 11/89 |
| | | | 251/129.04 |
| 2014/0130878 A1* | 5/2014 | Marinez | F17D 3/01 |
| | | | 137/487.5 |
| 2014/0224829 A1* | 8/2014 | Capone | B05B 11/1015 |
| | | | 222/23 |
| 2014/0305525 A1* | 10/2014 | Le Moing | F16K 37/0083 |
| | | | 137/553 |
| 2014/0374615 A1* | 12/2014 | Hidem | G16Z 99/00 |
| | | | 250/393 |
| 2015/0176721 A1* | 6/2015 | Schoonover | G01M 99/00 |
| | | | 702/35 |
| 2016/0069772 A1* | 3/2016 | Gnoss | G05B 15/02 |
| | | | 700/282 |
| 2016/0216713 A1* | 7/2016 | Mudd | G05D 7/0635 |
| 2018/0112795 A1* | 4/2018 | Anderson | G05B 23/024 |
| 2018/0113442 A1* | 4/2018 | Nixon | G05B 19/4184 |
| 2022/0112961 A1* | 4/2022 | Dyrdal | F16K 17/0413 |

* cited by examiner

Figure 3:
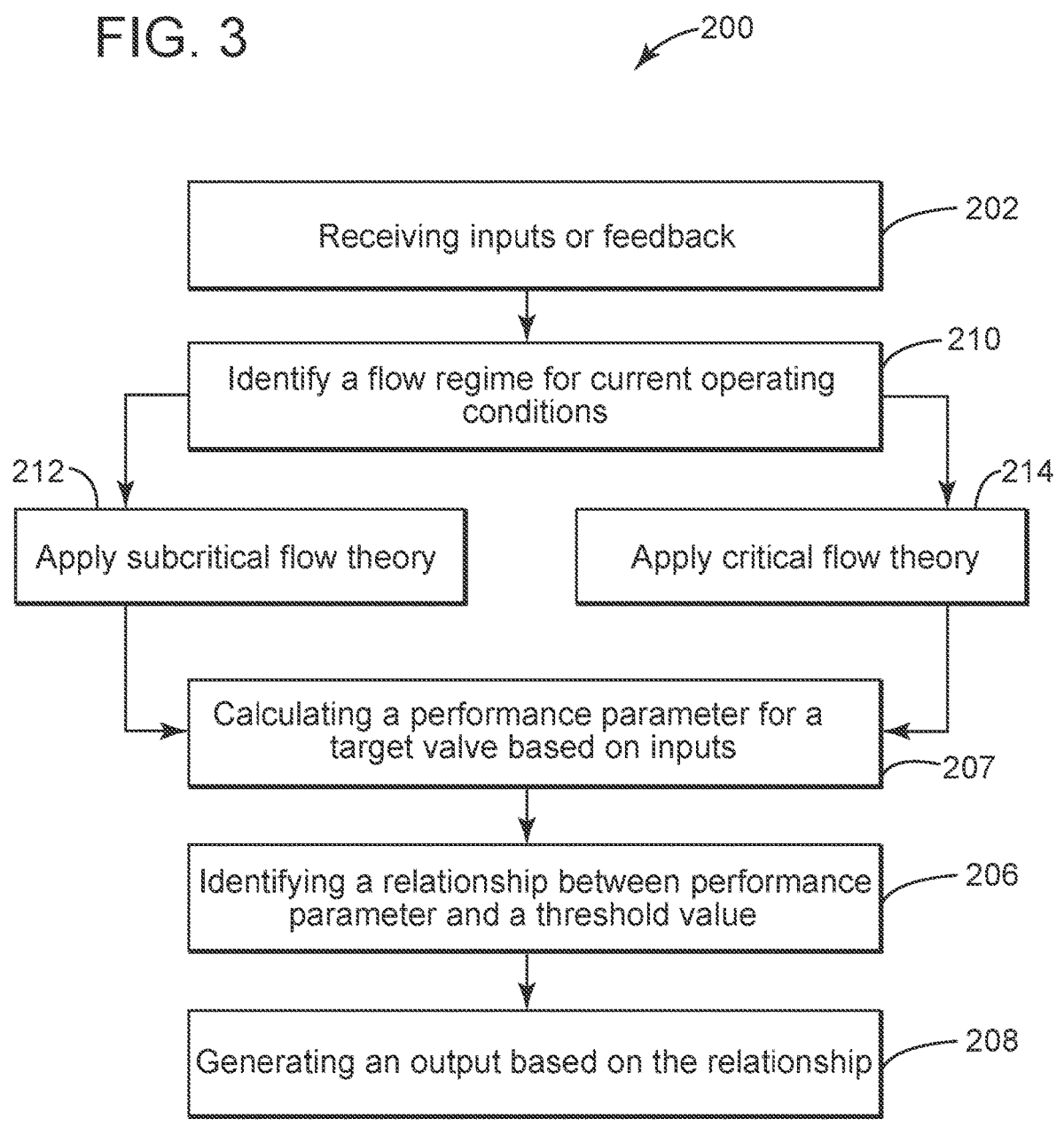

Receiving inputs or feedback — 202

Identify a flow regime for current operating conditions — 210

212 — Apply subcritical flow theory

Apply critical flow theory — 214

Calculating a performance parameter for a target valve based on inputs — 207

Identifying a relationship between performance parameter and a threshold value — 206

Generating an output based on the relationship — 208

RE-EVALUATING VALVE FIT AND FUNCTION ON A PROCESS LINE

BACKGROUND

Flow controls play a critical role in many industrial facilities. Power plants and industrial process facilities, for example, use different types of flow controls to manage flow of a material, typically fluids, throughout vast networks of pipes, tanks, generators, and other equipment. At the design stage, engineers develop and layout structure for process lines or other distribution networks at these facilities. The design process often leverages software to select flow controls, like control valves. Engineers provide or input data into the software, including flow rates, pressure, material properties, among other system-related parameters. The software then identifies valves of appropriate size (or configuration) that theoretically achieve specific parameters on the process line. However, the "design" data may not reflect actual operating parameters because these parameters would only become known after the process line is built and the valves are in service for some time.

Control software at industrial plants can often perform diagnostics in "real-time" to accommodate for this lack of data at the design stage. These systems may gather information that describes performance of control valves, for example, data that defines travel or position, air use, packing friction, and the like. The system can generate values from this data to map or trend performance. By comparing the values to expected thresholds, like expected position, the system can potentially identify abnormal operation that is precursor to more disruptive, problematic operation.

SUMMARY

The subject matter of this disclosure relates to improvements to device and process diagnostics. Of particular interest herein are embodiments that can evaluate flow controls, like control valves, in service as part of a process line. These embodiments can include systems that provide real-time analysis of control valves, using data that the control system collects from the device, as well as data that describes actual working conditions on the process line. Use of this "working data" may make up for inconsistencies or wrong assumptions made in the design stage because it contemplates fitness and function under actual conditions that the control valve faces in service. As a result, the proposed systems herein can identify problems, like undersized or oversized valves, valve cavitation, or like performance anomalies or issues, that operators and maintenance personnel might not notice if only using data that describes performance specific to each device.

DRAWINGS

The specification refers to the following drawings:

FIG. 3 depicts a flow diagram for an embodiment of a method for operating a valve control system.

Figure 1:
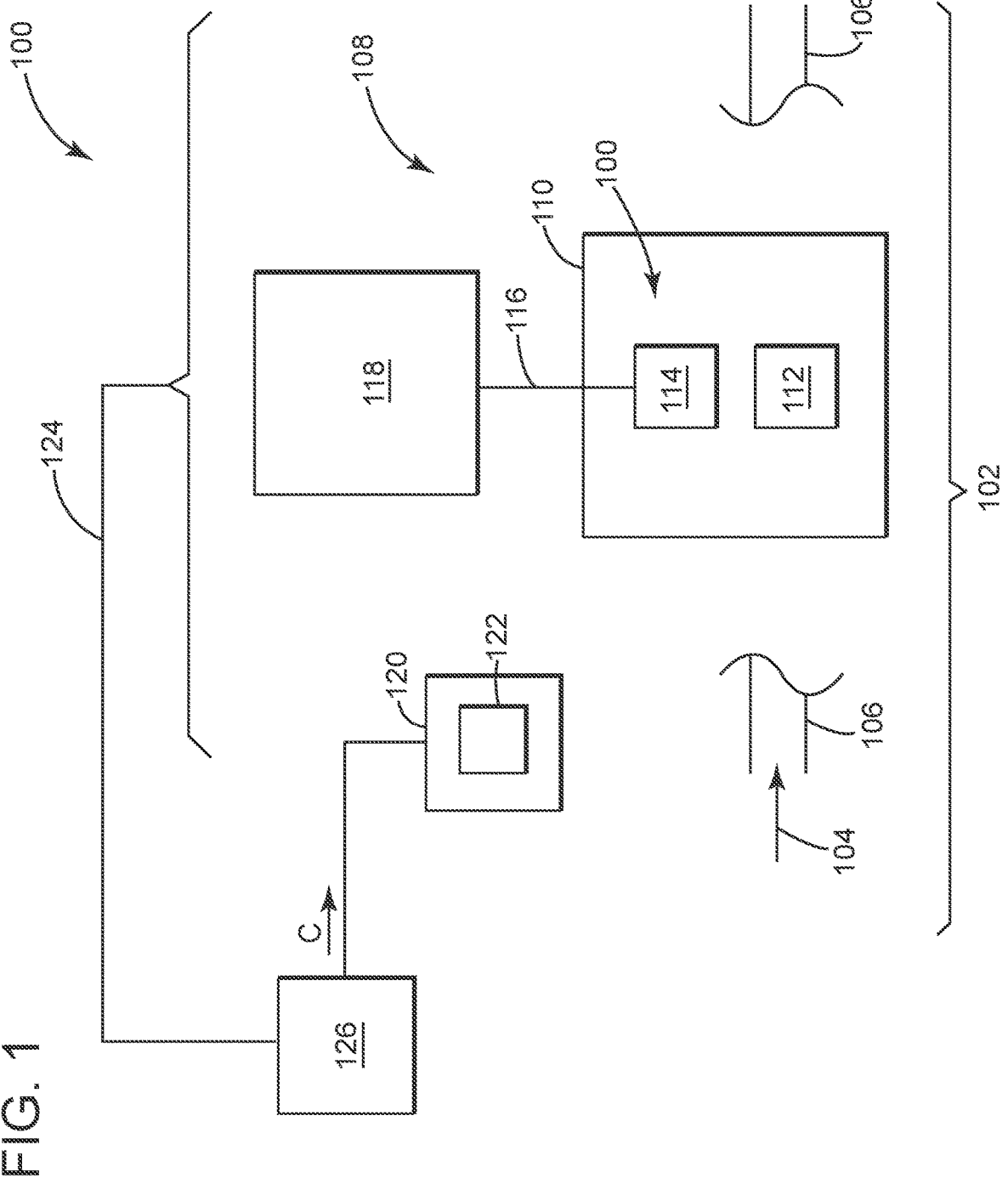
FIG. 1 depicts a schematic diagram of an embodiment of a valve control system.

These drawings and any description herein represent examples that may disclose or explain the invention. The examples include the best mode and enable any person skilled in the art to practice the invention, including making and using any devices or systems and performing any incorporated methods. The drawings are not to scale unless the discussion indicates otherwise. Elements in the examples may appear in one or more of the several views or in combinations of the several views. The drawings may use like reference characters to designate identical or corresponding elements. Methods are exemplary only and may be modified by, for example, reordering, adding, removing, and/or altering individual steps or stages. The specification may identify such stages, as well as any parts, components, elements, or functions, in the singular with the word "a" or "an;" however, this should not exclude plural of any such designation, unless the specification explicitly recites or explains such exclusion. Likewise, any references to "one embodiment" or "one implementation" should does not exclude the existence of additional embodiments or implementations that also incorporate the recited features.

DESCRIPTION

The discussion now turns to describe features of the embodiments shown in drawings noted above. These embodiments use device-level diagnostics as part of process line management systems. These systems provide operators or facility personnel, like technicians or engineers, with tools to understand or evaluate their assets in-service on the process line. These tools are useful to troubleshoot problems, predict potential failures, and proactively schedule maintenance. As a result, operators are in a much better position to avoid lengthy and costly shutdowns that can impact production. Other embodiments are contemplated within the scope and spirit of this disclosure.

FIG. 1 depicts a schematic diagram of an example of a control system 100. This example is part of a distribution network 102, typically designed to carry material 104 through a network of conduit 106. A flow control 108 may connect in-line with the conduit 106. The flow control 108 may include a valve body 110 that houses a seat 112 and a closure member 114, which can move to positions relative to the seat 112 to regulate flow of material 104. A valve stem 116 may connect the closure member 114 with an actuator 118. The flow control 108 may also have a valve positioner 120 with operating hardware 122. In one implementation, the control system 100 may include a feedback loop 124 that provides data to a system controller 126 that generates a control signal C.

Broadly, the control system 100 may be configured to evaluate device performance. These configurations may process data that defines actual working conditions for the device. This data may occur in real-time, or the process may periodically collect and store data in a repository for processing to occur at a later time. These features update analysis of the device done at the time of facility layout or design. The result is new values that can better describe fit or function of the device as it operates under conditions that may, and often are, different than those that available at the layout or design stage.

The distribution network 102 may be configured to deliver or move resources. These configurations may embody vast infrastructure. Material 104 may comprise gases, liquids, or mixes of liquids or gases. The conduit 106 may include pipes or pipelines, often that connect to pumps, boilers, and the like. The pipes may also connect to tanks or reservoirs. In many facilities, this equipment forms complex networks.

The flow control 108 may be configured to regulate flow of material 104 through the conduit 106 in these complex networks. These configurations may include control valves and like devices. The valve body 110 in such devices is often made of cast metals or forging. The structure may form a flange at the openings I, O. Adjacent pipes 106 may connect to these flanges to allow material 104 to flow through the device, for example, through an opening in the seat 112. The closure member 114 may embody a metal disc or metal plug. The valve stem 116 may embody an elongate cylinder or rod that connects on one end to this plug. The other end of the rod may couple with a pneumatic or electric manipulator that embodies the actuator 118.

The valve positioner 120 may be configured to process and generate signals. These configurations can control the position or "setpoint" of flow control 108. For example, the operating hardware 122 may employ electrical and computing components (e.g., processors, memory, executable instructions, etc.). These components may also include electro-pneumatic devices. Together, these devices can process the incoming control signal C to generate the outgoing actuator control signal $S_2$ to the actuator 118 and an appropriate pressure (or other parameters) for the control valve 108 to supply material 104 downstream according to process parameters.

The feedback loop 124 may be configured to provide data that informs operating parameters on the process line. These configurations may measure various operating parameters or conditions that prevail on, at, or proximate the flow control 108. Sensor or like data-collecting mechanisms may reside throughout the pipes or conduit, as well as on the valve(s). These sensors may provide device-specific information. In one example, the sensor may embody a mechanical linkage that couples the valve stem 116 with a rotatable disc on the valve positioner 120. The disc may rotate in response to the mechanical linkage. This feature changes position of magnets relative to a flux sensor, which in turn indicates the position of the closure member 114. Other sensors may include pressure sensors, temperature sensors, humidity sensors, flow sensors, and the like.

The system controller 126 may be configured to control devices on the process line. These configurations may be part of a larger control network (or "distributed control system" or "DCS"). The DCS maintains operation of all devices on process lines to ensure that materials flow in accordance with, for example, a prescribed process. In use, the system controller 124 may generate the control signal C to each of these devices. This electronic signal may define operating parameters, for example, setpoint for the valve(s). As noted above, the valve positioner 120 can convert this signal to suitable pressure for the actuator control signal $S_2$ it delivers to the actuator 118.

Figure 2:
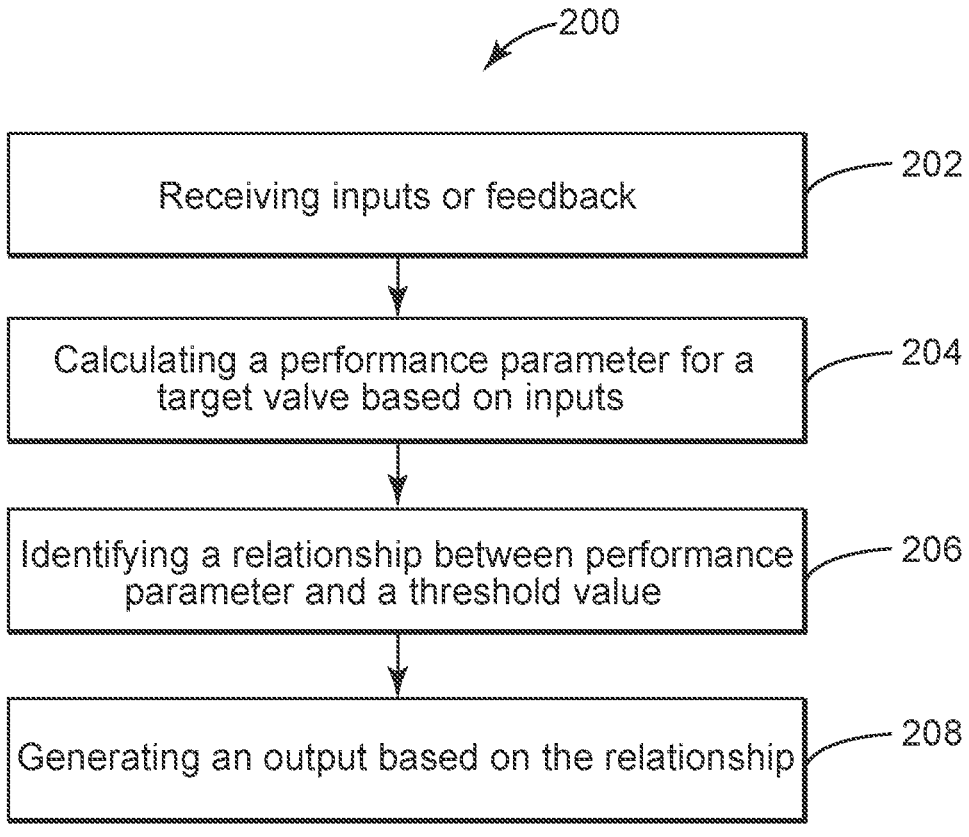
FIG. 2 depicts a flow diagram for an embodiment of a method for operating a valve control system.

FIG. 2 depicts a flow diagram of an example of steps for a method 200 for operating the system controller 126 or valve positioner. These steps may correspond with executable instructions, like computer or software programs, that configure the system controller 100 for certain operations. The instructions may, for example, process data to arrive at values that define operation of the flow control 108. These operations may set the flow control 108 to provide material to the process at required parameters. In one implementation, the method 200 may include, at stage 202, receiving inputs or feedback, and at stage 204, calculating a performance parameter for a target valve (or target valves) based on these inputs. The method 200 may also include, at stage 206, identifying a relationship between the performance parameter and a value for the target valve (or target valves). The method 200 may further include, at stage 208, generating an output based on this relationship.

At stage 202, the system controller 126 may receive certain inputs. These inputs may include valve position or pressure of the control signal $S_2$. The information may also reflect data about the process line itself. This data may include parameters of the material 104, including pressure upstream and downstream of the valve(s) or temperature. In one implementation, the data may also represent ambient conditions, for example, temperature, relative humidity, and pressure at or around the device. As noted, the data may identity working conditions for the device on the process line. This disclosure does contemplate, though, that some data may reflect "substitute" data, or data that might be selected or provided by operators, particularly where real-time data is not available or feasible.

At stage 204, the system controller 126 may calculate the performance parameter. The result may represent one of a variety of values that characterize the target device as it operates under current or "actual" working conditions. In one implementation, the value may describe a valve size, for example, its flow coefficient (Cv) or comparable metric. The values may also describe other "key performance indicators" or "KPIs," as desired. The KPIs may define noise, cavitation, valve travel or position, or fluid properties (like velocity, flow rate, or Mach number), among others. The algorithms and mathematical models to arrive at the KPIs may conform to industry standards. However, use of data that reflects actual working conditions on the process line is beneficial because this "actual" KPI may represent a better, more accurate analysis of the performance of the target valve(s).

At stage 206, the system controller 126 may compare the "actual" KPI to certain threshold values. The relationship between these two values may indicate problems or potential issues with the device, the process line, or the process. The target device may be too big (oversized) or to small (undersized) for the process. Either of these deficiencies may lead to noise that exceeds system specifications or industry standards. Undersize valves can "starve" the process of process fluid because of its limited flow capacity. These valves can also have higher pressure drop and, in some cases, cause a build-up of upstream pressure. This build-up creates back pressure that may damage pumps or other upstream equipment. Oversize valves can cost more and are bigger in size (and weight). The larger-than-required devices are typically more difficult to control, leading to instabilities in the process because the DCS must "hunt" for an appropriate setpoint for the device to satisfy the process parameters. It is also not uncommon that the plug (or disc) in an oversize valve operates in a position in close proximity to the seat. This position may lead to higher fluid velocity that can generate cavitation, noise, erosion, or other operating defects that can damage parts and, potentially, lead to failure of the device.

At stage 208, the system controller 126 may generate the indicators. The relationship may show that the target valve (or target valves) does not "fit" the actual, working conditions on the process line. The indicators may alert operators to this problem. In one implementation, this alert may provide operators with information on changes to the valve configuration, for example, changes in the valve trim that could remedy any sizing issues noted above. The information may also identify an appropriate valve size or model that the operator could use to replace the target valve. The indicators could also provide warnings to operators of the likelihood of cavitation, noise, back pressure, and the like. These warnings may resolve on a user interface or as messages (like email or text messages) on a connected device.

FIG. 3 depicts a flow diagram for another example of the method 200. This example may include, at stage 210, identify a flow regime for current operating conditions. The flow regime may include, for example, a "subcritical" flow regime that may occur when downstream pressure (P₂) is less than or equal to one-half the upstream pressure (P₁) of the device. This subcritical regime may cause the method 200 to continue, at stage 212, applying subcritical theory to calculate the performance parameter(s). Alternatively, the flow regime may correspond with a "critical" or "choked" flow regime where downstream pressure (P₂) is greater than one-half the upstream pressure (P₁) on the device. This regime can limit or place a ceiling on flow rate because any increase in pressure drop at constant inlet pressure will not result in any increase in flow through the device. For choked flow, the method 200 may continue, at stage 214, applying choked flow theory to calculate the performance parameters.

Values for the flow coefficient (Cᵥ) for liquids may correspond with the respective flow regime. For subcritical flow, for example, the value may be determined according to Equation (1) below:

$$C_v = \frac{Q}{N_1 F_p} \times \sqrt{\frac{(G_f)}{(P_1 - P_2)}},$$  Equation (1)

where q is flow rate, P₁ is upstream pressure in absolute units, P₂ is downstream pressure in absolute units, G_f is specific gravity (of liquid), N1 is a constant dependent on flow and pressure units, and Fp is piping geometry factor. Choked flow may affect the flow coefficient according to Equation (2) below:

$$C_v = \frac{q}{N_1 F_{LP}} \times \sqrt{\frac{G_f}{p_1 - F_f p_v}}.$$  Equation (2)

where P_v is fluid vapor pressure at a temperature T, F_{LP} is combined recovery factor and piping geometry factor, and F_F is liquid critical pressure.

Operators can use these values to differentiate among valves on their process lines. For example, the indicator may alert operators to flow controls that have an "actual" flow coefficient (Cᵥ) that deviates from initial calculations at the design phase. The method 200 may also maintain a record of these values to present to the operator as reference to changes that might occur on the process line, like changes in pressure or flow rate, which might not otherwise become apparent from conventional data analysis.

Both "subcritical" and "choked" flow regimes may generate cavitation. This phenomenon can increase noise and lead to damage to the flow control 108, as well as any adjacent or associated pipes 106 or equipment connected thereto. In one implementation, the method 200 may include steps to quantify a cavitation value or "sigma index" in both regimes. The indicator may correspond with an alert to inform operators that the sigma index is above the service sigma, which can help operators avoid cavitation-borne problems on the device.

The method 200 may also include steps to quantify other parameters, as well. These parameters may include a % open value for the valve in both regimes. This value defines the position of the closure member 114 relative to the seat 112, preferably in relation to a closed position (or 0% open) that describes conditions with the closure member 114 in contact with the seat 112. The parameters may further include steps to calculate the velocity or flow rate of material 104 as it transits the valve body 110.

In view of the foregoing, the improvements herein can help facilities maintain efficient productive processes. The proposed design evaluates valves on-line with data that reflect working conditions concomitant with the analysis. This feature can identify adverse impacts that may occur to line valves in response to, for example, operator changes to process parameters that are necessary to accommodate different raw materials or other production anomalies. In one implementation, the design can find fit-and-function issues with certain valves because the new parameters may fall outside the original "design" criteria for the valves. These issues may percolate undetected for some time until the valve itself fails or begins to fail prior to its known end-of-life design.

The examples below include certain elements or clauses one or more of which may be combined with other elements and clauses to describe embodiments contemplated within the scope and spirit of this disclosure. The scope may include and contemplate other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method, comprising:
at a controller on a valve,
receiving data about the valve that reflects working conditions for the valve on a process line;
calculating a valve parameter for the valve based on the data;
comparing the valve parameter to a known threshold level; and
generating an output based on a relationship between the valve parameter and the known threshold level, the output corresponding with sizing issues that require a change to the valve that will change the valve in a way to properly fit the working conditions on the process line; and
at the valve,
replacing the valve trim to remedy the sizing issues.

2. The method of claim 1, wherein the valve parameter is flow coefficient.

3. The method of claim 1, wherein the output identifies the fit of the valve on the process line as relates to the working conditions.

4. The method of claim 1, wherein the output correlates size of the valve on the process line as relates to the working conditions.

5. The method of claim 1, wherein the output correlates % open of the valve on the process line as relates to working conditions.

6. The method of claim 1, further comprising:
quantifying a cavitation index for the valve.

7. The method of claim 1, further comprising:
identifying a flow regime for the valve based on the data; and
applying a particular theory of calculations that corresponds with the flow regime.

8. The method of claim 1, wherein the valve parameter is based on choked flow theory of calculations.

9. The method of claim 1, wherein the valve parameter is based on subcritical flow theory of calculations.

10. The method of claim 1, wherein the valve parameter describes flow rate through the valve.

11. A control system, comprising:
a valve having valve trim;
a controller coupled to the valve; and
a feedback loop, the feedback loop providing data to the controller that describes working conditions for the valve on a process line,
wherein the controller is configured to process the data according to the following:
calculating a valve parameter for the valve based on the data;
comparing the valve parameter to a known threshold level; and
generating an output based on a relationship between the valve parameter and the known threshold level, the output corresponding with sizing issues that require a change to the valve that will change the valve in a way to properly fit the working conditions on the process line,
wherein the change replaces the valve trim in the valve to remedy the sizing issues.

12. The control system of claim 11, wherein the valve parameter is flow coefficient.

13. The control system of claim 11, wherein the output identifies the fit of the valve on the process line as relates to the working conditions.

14. The control system of claim 11, wherein the output correlates size of the valve on the process line as relates to the working conditions.

15. The control system of claim 11, wherein the output correlates % open of the valve on the process line as relates to working conditions.

16. The control system of claim 11, further comprising: quantifying a cavitation index for the valve.

17. The control system of claim 11, further comprising:
identifying a flow regime for the valve based on the data; and
applying a particular theory of calculations that corresponds with the flow regime.

18. The control system of claim 11, wherein the valve parameter is based on choked flow theory of calculations.

19. The control system of claim 11, wherein the valve parameter is based on subcritical flow theory of calculations.

20. The control system of claim 11, wherein the valve parameter describes flow rate through the valve.

* * * * *